Patented July 2, 1935

2,006,967

UNITED STATES PATENT OFFICE 2,006,967

SEED TREATMENT

William J. Sparks, Niagara Falls, N. Y., assignor to E. I. du Pont de Nemours & Company, Incorporated, Wilmington, Del., a corporation of Delaware No Drawing. Application September 1, 1933, Serial No. 687,846

7 Claims. (Cl. 47—58)

This invention relates to the chemical treatment of seeds and more particularly to a method for accelerating the germination of seeds.

The rapid germination of planted seeds usually is desirable. In the case of many crops, time is an important element since the value of the harvested crop largely depends upon the earliness with which it can be placed on the market. This applies not only to plants grown for food but as well to flowers and other ornamental plants which are grown from seeds. Also rapid germination usually decreases the loss caused by attacks of bacteria, fungi and other pests which are liable to attack the seed at any time after it has been sown, since a vigorously germinating seed is more resistant to such attack than one which is slow to germinate. Heretofore, the germination of seeds has been accelerated by soaking them for a period in water prior to planting. With some types of seeds soaking in water prior to planting is a distinct advantage; with others the advantage gained is so small as to render the operation not worth while. A disadvantage of the water treatment is that often before the treatment has proceeded to the length of time required to produce germination, fermentation or other bacterial decomposition of the seeds occurs.

An object of this invention is to provide a method for accelerating the germination of seeds in the presence of moisture. Other objects will be apparent from the following description of my invention.

I have discovered that the germination of seeds is markedly accelerated by contacting the seeds with hydrogen peroxide. Ordinarily the hydrogen peroxide used is in dilute concentration, that is not over around 5 to 6% by weight. The seeds to be germinated may be soaked, sprayed or otherwise contacted with the dilute hydrogen peroxide solution and the treatment is preferably continued until it is apparent that germination has commenced, whereupon the seeds may be planted. If desired, the peroxide treatment may be continued until the seed has produced a sprout and rootlets of appreciable size. Also in many cases beneficial results may be obtained by discontinuing the treatment before there is evidence of actual germination, that is before sprouts can be seen. However I prefer to continue the treatment until sprouts are observed on at least 50% of the seeds being treated and then to plant the seeds.

The strength of solution to be used will vary with different types of seeds and in any case may be determined by a few simple experiments. An important factor in determining the strength of solution used is the resistance of the particular seed in question to the action of hydrogen peroxide. Some seeds which have relatively thin skins or for some other reason are easily damaged must be treated with relatively dilute peroxide solutions; otherwise the germ of the seed may be destroyed or damaged by the peroxide. Hence for each type of seed or indeed for each variety of seed, there is a maximum concentration of hydrogen peroxide which may be used; higher concentrations will damage the seed. The strength of the hydrogen peroxide solution to be used also will vary according to the natural tendency of the seed to germinate under growing conditions. That is, a seed which is naturally slow to germinate usually will require the use of a peroxide concentration close to the maximum strength allowable for that particular seed, in order to obtain the best results.

Many seeds contain or generate enzymic substances which catalyze the decomposition of hydrogen peroxide. In some cases the catalytic effect of the enzymes may be such that the hydrogen peroxide is substantially completely decomposed before the desired germinating effect has been secured. In such cases, I prefer to replenish the decomposed hydrogen peroxide from time to time as necessary to maintain the desired peroxide concentration until the required germinating effect has been obtained.

I am aware that heretofore it has been proposed to use active oxygen compounds in conjunction with formaldehyde in the treatment of seeds. However, in this case the active oxygen compound is employed to oxidize the formaldehyde in order to prevent the latter substance from damaging the seeds and so far as I am aware, prior to my invention it has not been known that hydrogen peroxide would affect the germinating power of seeds.

My invention may be illustrated by the following examples:

*Example 1*

Separate portions of unhusked barley were immersed in water and in hydrogen peroxide solutions of the following strengths:

Volume
0.05
0.1
1.5
2.0
5.0

After these had stood at room temperature for 16 hours, germination was observed to have started in the barley immersed in the hydrogen peroxide solutions of strengths of 0.1 volume and higher. At the end of 40 hours all of the barley in these hydrogen peroxide solutions was germinated. The barley immersed in water and in the 0.05 volume hydrogen peroxide had substantially no germinated grains and had started to ferment as evidenced by a sour odor. The barley in the peroxide solutions in which germination occurred had a fresh, sweet odor and showed no signs of fermentation.

Example 2

Portions of white navy beans were immersed in water, 5 volume hydrogen peroxide and 10 volume hydrogen peroxide, respectively at room temperature. Within 24 hours some germination was observed in the hydrogen peroxide solutions and after 4 days 92% of the beans in both of the hydrogen peroxide solutions had germinated. There was no evidence of germination in the beans immersed in water after 11 days.

Example 3

Pop corn seed was steeped in open glass dishes containing 2.0, 4.0, 8.0 and 20.0 volume hydrogen peroxide solutions and water, respectively. The corn immersed in water fermented and failed to sprout within 10 days. The corn immersed in the hydrogen peroxide of concentrations of 2.0 to 8.0 volume, inclusive, started to germinate within 36 hours and was about 100% germinated within 2 days. The corn immersed in the 20.0 volume hydrogen peroxide did not start to germinate within two days; about one third of it had germinated after 5 days.

Example 4

Portions of various varieties of flower seeds were immersed in various concentrations of hydrogen peroxide and in water, respectively and allowed to stand at room temperature. Those immersed in the hydrogen peroxide solutions were from 75 to 100% germinated after periods varying from 1 to 7 days. Most of the seeds immersed in water showed no signs of germination after 9 days; two varieties required 4 and 9 days, respectively before germination started. The data is given in detail in the following table:

| Name of seed | Concentration of $H_2O_2$ solution | Germination in $H_2O_2$ solution | | Germination in water |
|---|---|---|---|---|
| | | Time | Germination | Time required for first sprout to appear |
| | Volume | Days | Percent | |
| Mignonette | 0.5 | 2 | 75 | (*). |
| Petunia | 0.1 | 2 | 100 | 4 days. |
| Cosmos | 0.5 | 1 | 100 | (*). |
| Dahlia | 2.0 | 2 | 75 | (*). |
| Geum | 0.1 | 7 | 75 | (*). |
| Chrysanthemum | 0.1 | 2 | 75 | 9 days. |
| Salvia | 0.5 | 2 | 100 | (*). |
| Centaurea | 0.1 | 2 | 75 | (*). |

* No evidence of germination after 9 days.

It will be apparent that various methods of applying hydrogen peroxide to seeds may be utilized without departing from the spirit and scope of my invention. Thus the seeds may be immersed in hydrogen peroxide solutions or the solutions may be sprayed onto the seeds or the seeds may be contacted with the solution in various other ways. The germination of seeds may also be accelerated according to my invention by treating the soil with hydrogen peroxide. Likewise, the seeds or the soil may be treated with compounds which react with water to form hydrogen peroxide, for example persalts such as perborate, persulfates and the like or peroxides, for example, barium peroxide or zinc peroxide, or organic peroxides, for example, urea peroxide. One method of carrying out my invention comprises treating the seeds with such hydrogen peroxide forming substances in such manner that the peroxide compound adheres to the seed and then planting the seed in moistened ground or otherwise contacting the seed with moisture. This may be done, for example by dusting the seeds with a powdered, solid hydrogen peroxide forming compound. For many types of seeds, the amount of hydrogen peroxide liberated by this method will be sufficient to produce the required germination accelerating effect.

I claim:

1. A process for accelerating the germination of seeds prior to planting comprising contacting seeds with hydrogen peroxide in the presence of water until the seeds have begun to germinate.

2. A process for accelerating the germination of seeds prior to planting comprising immersing seeds in a dilute solution of hydrogen peroxide until the seeds have begun to germinate.

3. A process for accelerating the germination of seeds prior to planting comprising immersing seeds in hydrogen peroxide solutions of 0.5 to 5.0 volume strength until the seeds have begun to germinate.

4. A process for accelerating the germination of seeds prior to planting comprising spraying seeds with a dilute solution of hydrogen peroxide until the seeds have begun to germinate.

5. A process for accelerating the germination of seeds prior to planting comprising applying a substance reactive with water to form hydrogen peroxide to seeds and subsequently exposing the seeds to moisture until the seeds have begun to germinate.

6. A process for accelerating the germination of seeds prior to planting comprising applying a substance reactive with water to form hydrogen peroxide to seeds until said seeds have begun to germinate and subsequently planting the seeds.

7. A process for accelerating the germination of seeds prior to planting comprising applying a persalt to seeds and subsequently exposing the seeds to moisture until the seeds have begun to germinate.

WILLIAM J. SPARKS.